(12) United States Patent
Hanaoka et al.

(10) Patent No.: US 12,113,350 B2
(45) Date of Patent: Oct. 8, 2024

(54) POWER SUPPLY SYSTEM, PROTECTION COORDINATION METHOD AND PROGRAM

(71) Applicant: Nippon Telegraph and Telephone Corporation, Tokyo (JP)

(72) Inventors: Naoki Hanaoka, Musashino (JP); Hidetoshi Takada, Musashino (JP); Masaki Kozai, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 96 days.

(21) Appl. No.: 17/920,098

(22) PCT Filed: May 18, 2020

(86) PCT No.: PCT/JP2020/019676
§ 371 (c)(1),
(2) Date: Oct. 20, 2022

(87) PCT Pub. No.: WO2021/234788
PCT Pub. Date: Nov. 25, 2021

(65) Prior Publication Data
US 2023/0178975 A1 Jun. 8, 2023

(51) Int. Cl.
*H02H 3/087* (2006.01)
*H02H 3/16* (2006.01)
*H02H 7/26* (2006.01)

(52) U.S. Cl.
CPC .............. *H02H 3/087* (2013.01); *H02H 3/16* (2013.01); *H02H 7/268* (2013.01)

(58) Field of Classification Search
CPC ..... H02H 7/26–268; H02H 3/087; H02H 3/16
See application file for complete search history.

(56) References Cited

U.S. PATENT DOCUMENTS

| 2016/0352091 A1* | 12/2016 | Qi ............................ H02H 3/10 |
| 2020/0136389 A1* | 4/2020 | Leon Garcia .......... H02H 7/268 |
| 2020/0144807 A1* | 5/2020 | Garrison ................ H02H 7/268 |

OTHER PUBLICATIONS

Takeno, "Explanation of technical standards and interpretations of electrical equipment (Part 4) Performance and facilities of automatic circuit breakers during overcurrents and ground faults," Electric technology explanation lecture, Japan Electric Engineer's Association, retrieved on Apr. 28, 2020, retrieved from URL <https://www.jeea.or.jp/course/contents/11104/>, 15 pages (with English Translation).

* cited by examiner

*Primary Examiner* — Jared Fureman
*Assistant Examiner* — Christopher J Clark
(74) *Attorney, Agent, or Firm* — Fish & Richardson P.C.

(57) ABSTRACT

A feeding system feeds power from a power unit to a load via a feeding line and includes a protection device configured to operate by a current equal to or greater than a predetermined current; a monitoring unit configured to monitor whether an accident occurs in the feeding line; and a gate block unit configured to stop the feeding of the power of the power unit when the monitoring unit detects that an accident causing the protection device not to operate has occurred.

12 Claims, 9 Drawing Sheets

POWER SUPPLY SYSTEM, PROTECTION COORDINATION METHOD AND PROGRAM

CROSS-REFERENCE TO RELATED APPLICATIONS

This application is a National Stage application under 35 U.S.C. § 371 of International Application No. PCT/JP2020/019676, having an International Filing Date of May 18, 2020.

The disclosure of the prior application is considered part of the disclosure of this application, and is incorporated by reference in its entirety into this application.

TECHNICAL FIELD

The present invention relates to a technology for detecting a fault such as a short circuit occurring in a feeding system and cutting off a fault occurrence portion or stopping power.

BACKGROUND ART

In general, in feeding systems, by appropriately setting sensitivity and an operational time of a protection device (a molded case circuit breaker (MCCB), a fuse, or the like), protection coordination is performed to cut off an accident portion quickly and protect other sound circuits when an accident has occurred.

For example, when a short circuit occurs in a feeding line portion close to a load connected to the end of a feeding system, a considerably large short-circuit current normally flows to the feeding line. Therefore, a protection device operates instantaneously and a short-circuited portion is cut off from a power supply.

CITATION LIST

Non Patent Literature

[NPL 1] Explanation of Electrical equipment technology standards and interpretation, https://www.jeea.or.jp/course/contents/11104/, retrieved on Apr. 28, 2020

SUMMARY OF THE INVENTION

Technical Problem

In communication buildings, data centers, or the like, direct-current feeding systems have been introduced to reduce power loss of entire systems and achieve energy saving. In such direct-current feeding systems, wiring lengths of feeding lines from power supplies (rectifying devices or the like) to loads (ICT devices or the like) are lengthened to, for example, hundreds of meters in some cases. When power is fed to outdoor devices or the like, wiring lengths are further lengthened to a few kilometers in some cases.

In feeding systems in which wiring lengths are long, wiring resistance increases. Therefore, even when the above-described short circuit occurs, a short-circuit current decreases, and thus a protection device does not operate (or takes a long time to begin operating). Such a problem is not limited to a short circuit and also occurs with a ground fault (also referred to as electric leakage). A short circuit and a ground fault are collectively referred to as "accidents."

The present invention has been devised in view of such circumstances and an objective of the present invention is to provide a technology capable of cutting off an accident portion from a power supply or stopping the power supply even when an accident causing a protection device not to operate has occurred.

Means for Solving the Problem

According to the technology of the present disclosure, a feeding system that feeds power from a power unit to a load via a feeding line includes
 a protection device configured to operate with a current equal to or greater than a predetermined current;
 a monitoring unit configured to monitor whether an accident occurs in the feeding line; and
 a gate block unit configured to stop the feeding of the power of the power unit when the monitoring unit detects that an accident causing the protection device not to operate has occurred.

Effects of the Invention

According to the technology of the present disclosure, it is possible to provide a technology capable of cutting off an accident portion from a power supply or stopping the power supply even when an accident causing a protection device not to operate occurs.

DESCRIPTION OF EMBODIMENTS

Hereinafter, an embodiment of the present invention (the present embodiment) will be described with reference to the drawings. The embodiment to be described below is merely exemplary and embodiments to which the present invention is applied are not limited to the following embodiment.

A feeding system according to the present embodiment is assumed to be a direct-current feeding system in which a wiring length of a feeding line is long (hereinafter referred to as a feeding system). However, application of the present invention is not limited to a direct-current feeding system in which a wiring length of a feeding line is long.

Problem and Overview of Embodiment

Figure 1:
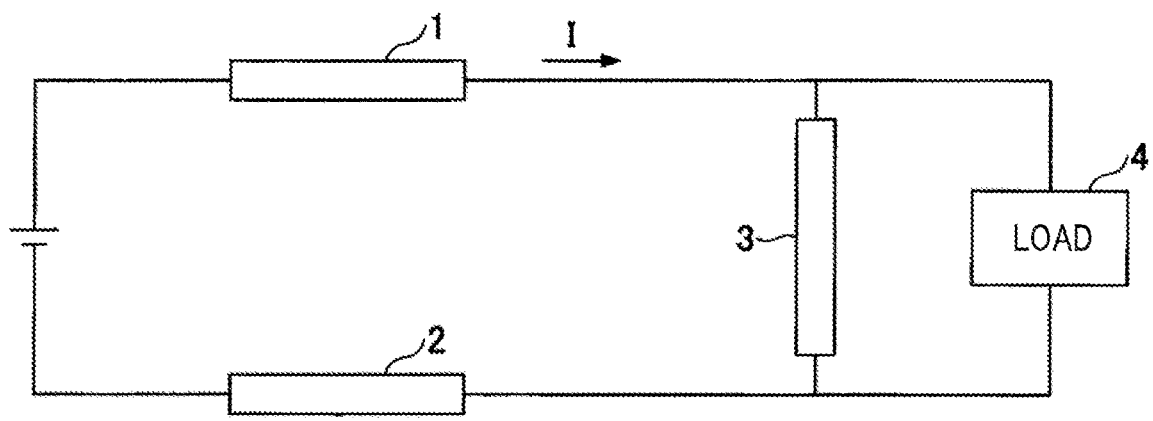
FIG. 1 is a diagram illustrating an example of a feeding system for long-distance power feeding.

As described above, wiring resistance increases in a feeding system in which a wiring length of a feeding line is long. FIG. 1 is a diagram illustrating an example of a feeding system in which a wiring length is long. As illustrated in FIG. 1, in the feeding system, a load 4 is connected to a destination of a long feeding line extending from a power supply.

It is assumed that a short circuit occurs near the load 4. That is, as illustrated in FIG. 1, a positive-side feeding line and a negative-side feeding line are connected at low resistance 3 near the load 4. In this case, when a wiring length is short, wiring resistances 1 and 2 decrease, and thus a short-circuit current I increases. Here, on the other hand, since the wiring length is long, the wiring resistances 1 and 2 increase, and thus the short-circuit current I decreases. Therefore, although a protection device is disposed halfway along a feeding line, there is concern of the protection device not operating normally.

Figure 2:
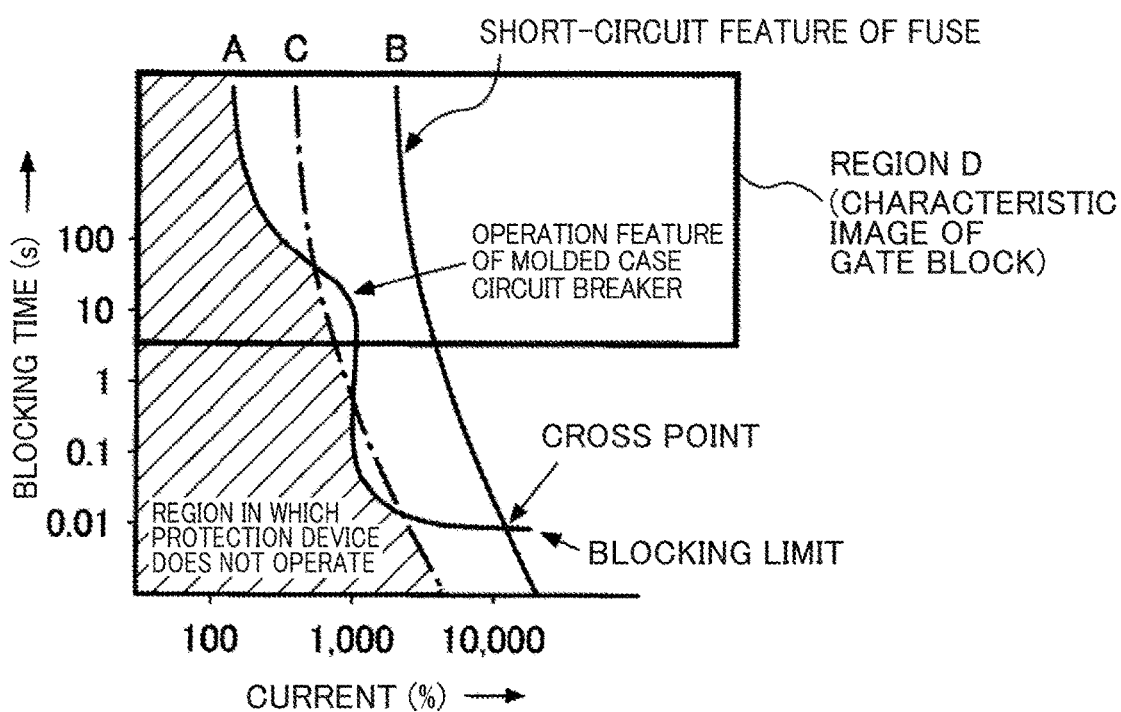
FIG. 2 is a diagram illustrating a dead zone.

FIG. 2 is a diagram illustrating an example of a protection coordination curve of protection devices (a molded case circuit breaker A, a fuse B, and a fuse C). In FIG. 2, the horizontal axis represents a short-circuit current value (a ratio (%) to an operation current value) and the vertical axis represents a time until a protection device is blocked. As illustrated in FIG. 2, for example, when a short-circuit current equal to or greater than 1000% flows to the molded case circuit breaker A, the molded case circuit breaker A instantaneously operates to block the current. A minimum current with which a protection device can operate is referred to as a rated current.

However, a short-circuit current I in the feeding system in which the wiring length is long, as illustrated in FIG. 1, corresponds to a region in which a protection device indicated by a shaded portion of FIG. 2 does not operate. Therefore, with the short-circuit current I, the protection devices A to C cannot operate ("cannot operate" may also mean that they take a considerable long time to operate).

In the foregoing example, since the short-circuit current I is small, there are cases in which the protection devices cannot operate in a short time or a case in which the protection device cannot operate. However, by monitoring a change in a voltage or a current in the feeding line, it is possible to detect the short circuit itself corresponding to the shaded portion.

Accordingly, in the embodiment, when a gate block unit is embedded in the feeding system as a part of protection coordination and a short circuit is detected in the feeding line, a gate block is performed to stop feeding power. Thus, even when the protection device does not operate due to occurrence of a short circuit, it is possible to prevent an influence of the short circuit from spreading upward (to another system). In FIG. 2, a region D indicates a characteristic image of the gate block unit.

Figure 3:
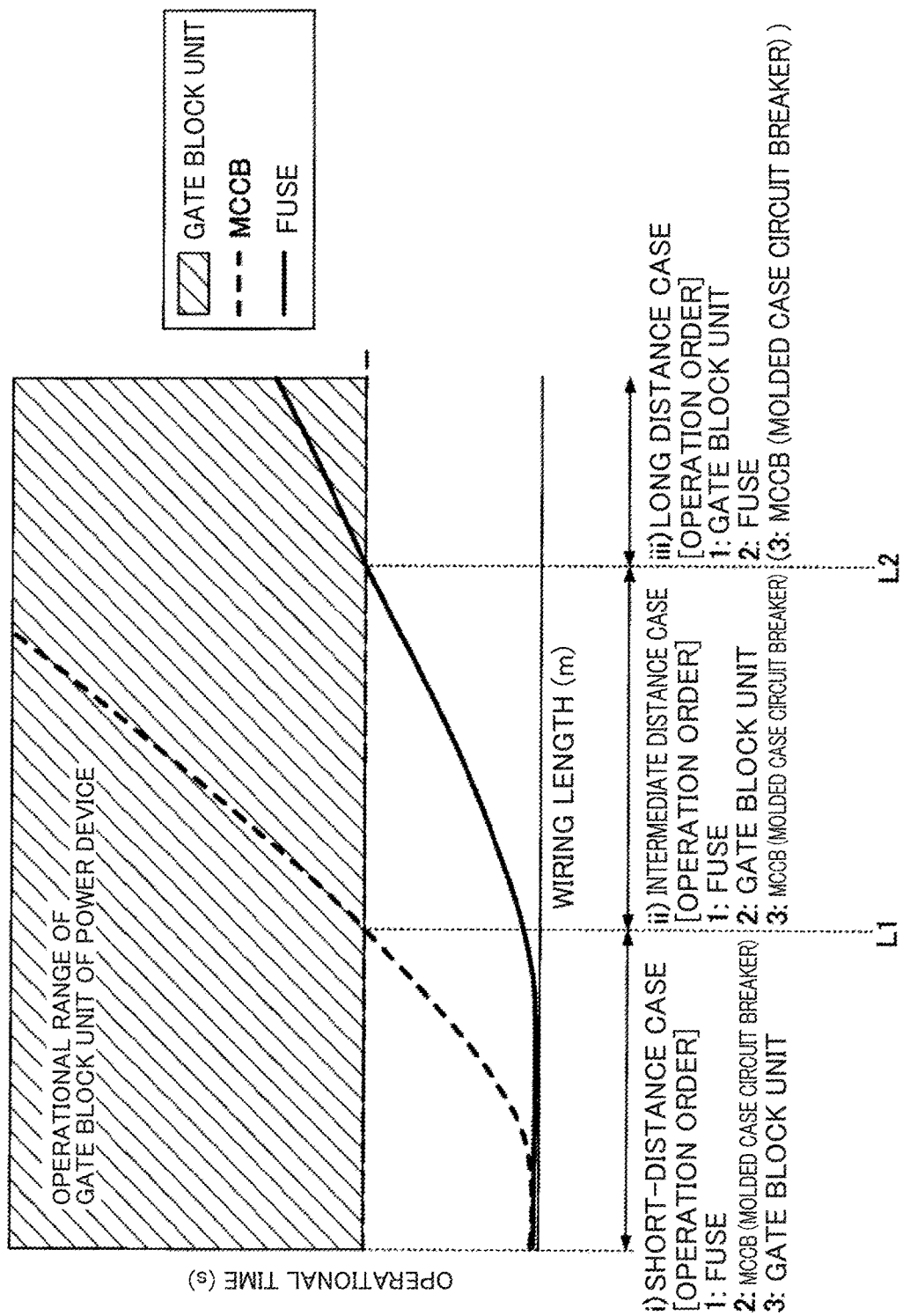
FIG. 3 is a diagram illustrating an overview of an embodiment of the present invention.

FIG. 3 is a diagram illustrating a relation between a wiring length of a feeding line of the feeding system and operational times of the gate block unit and the protection devices (the MCCB and the fuse). Based on the relation between the wiring length and the operational times illustrated in FIG. 3, an operation order in the case of the wiring length=0 to L1 is "fuse→MCCB→gate block unit." An operation order in the case of the wiring length=L1 to L2 is "fuse→gate block unit→MCCB." An operation order in the case in which the wiring length is longer than L2 is "gate block unit→fuse→MCCB." When the wiring length is longer than L2, it is assumed that the MCCB does not operate for a long time. Therefore, "MCCB" is written in parentheses in FIG. 3.

In the embodiment, a case in which the wiring length is longer than L2 (the case of a long distance) is assumed. In this case, as illustrated in FIG. 3, the gate block unit first operates, and thus the gate block unit stops feeding power.

When the gate block unit stops feeding power, the protection device remains in the ON state. However, to restore the gate block unit (start feeding power), the protection device needs to remain in the OFF (blocked) state. After the gate block unit operates, the protection device may be turned off manually. In the embodiment, however, after the gate block unit operates, the protection device can be turned off (tripped) automatically.

(Exemplary Configuration of Feeding System)

Figure 4:
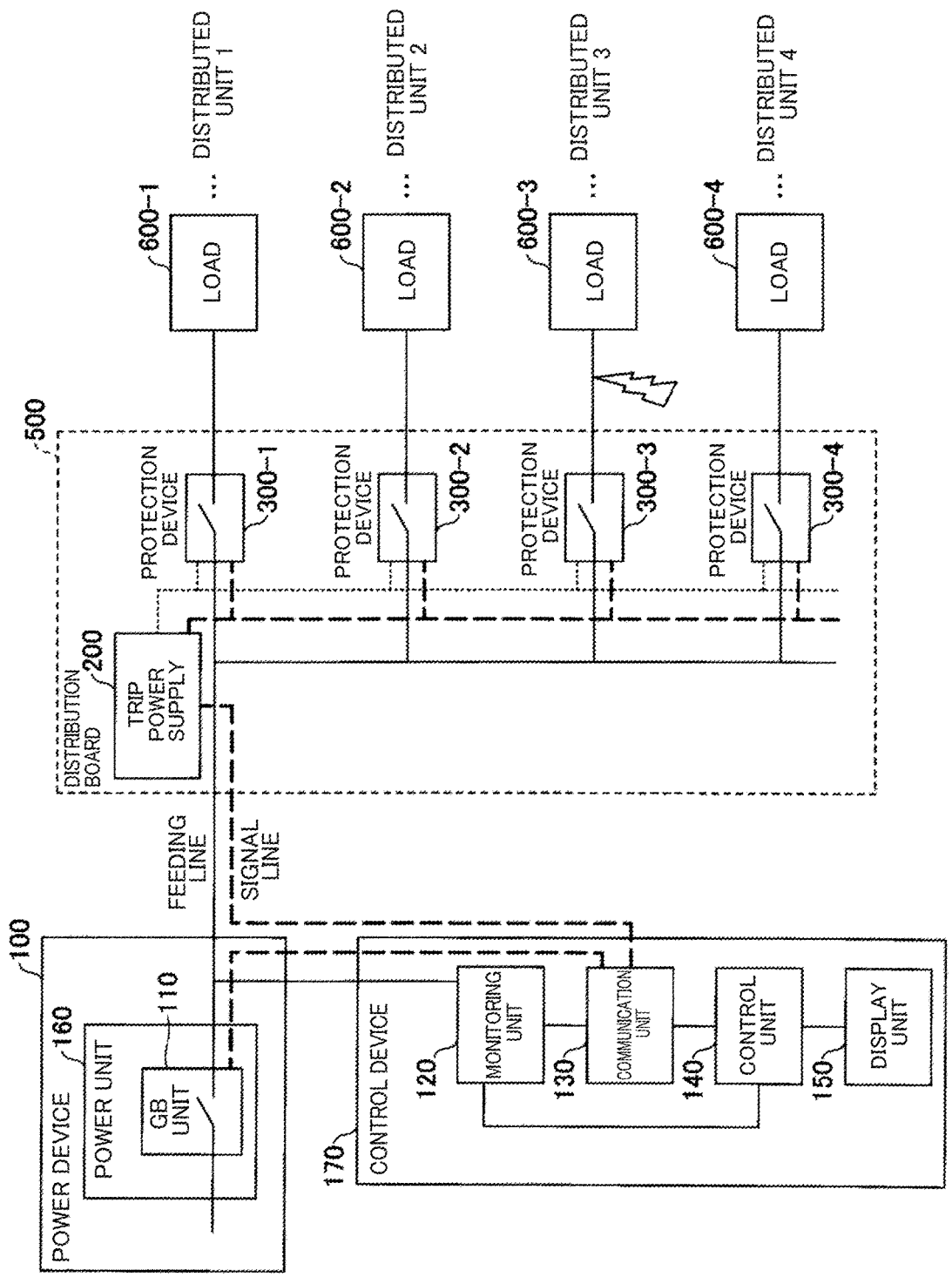
FIG. 4 is a diagram illustrating a configuration of the feeding system according to the embodiment of the present invention.

FIG. 4 illustrates an exemplary configuration of the feeding system according to the embodiment. As illustrated in FIG. 4, the feeding system according to the embodiment includes a power device 100, a control device 170, a distribution board 500, and loads 600-1 to 600-4. The distribution board 500 includes a trip power supply 200 and protection devices 300-1 to 300-4.

The power device 100 and the loads 600-1 to 600-4 are connected by feeding lines and the protection devices 300-1 to 300-4 are provided halfway along the feeding lines. In the example of FIG. 4, the feeding line is indicated as one cable. More specifically, the feeding line (cable) is formed by a positive-side feeding line and a negative-side feeding line.

Each device included in the feeding system is connected by the signal line and can transmit and receive signals via the signal line. The signal line may be a wired network such as a LAN or may be a wireless network such as a wireless LAN or a 5G network.

The distribution board 500 distributes a feeding line extended from the power device 100 into a plurality of feeding lines and enables power to be supplied to the plurality of distributed units. In the exemplary configuration of FIG. 4, there are distributed units 1 to 4. In one distributed unit, there are the protection device 300 and the load 600.

Figure 5:
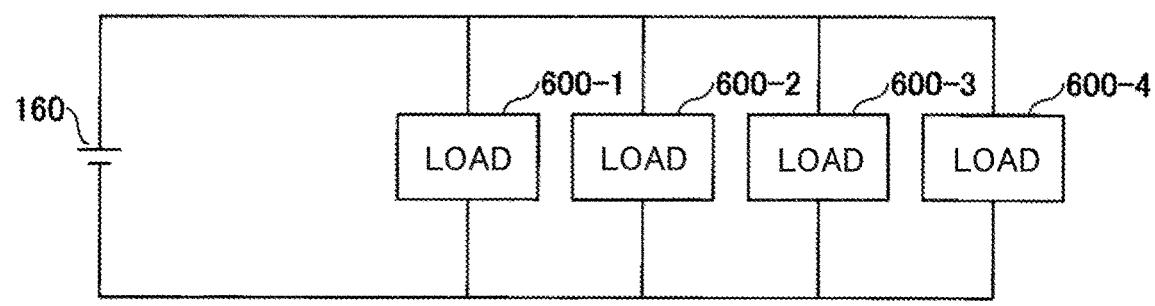
FIG. 5 is a diagram illustrating a connection example.

The distribution board 500 has a function of distributing the feeding line to connect the loads 600 in parallel from a power unit 160 as a basic function, as illustrated in FIG. 5. In the example of FIG. 4, the trip power supply 200 and the protection devices 300-1 to 300-4 are included in the distribution board 500, as an example. The distribution board 500 may have only the basic function, and the trip power supply 200 and the protection devices 300-1 to 300-4 may be provided outside of the distribution board 500.

The power device 100 is, for example, a rectifier and includes the power unit 160. The power unit 160 converts an alternating current received from a commercial power supply into a direct current and supplies direct-current power to a load side. The power unit 160 includes the gate block unit 110. The gate block unit 110 has a function of stopping feeding of power by the power unit 160 using a semiconductor switch or the like. In the embodiment, the gate block unit 110 operates based on a signal from the control device 170.

In the example illustrated in FIG. 4, the power device 100 and the control device 170 are illustrated as separate devices, but the control device 170 may be included inside the power device 100. A configuration and an operation of the control device 170 will be described below.

The trip power supply 200 can trip a specific protection device 300 based on a signal from the control device 170. Tripping the protection device 300 may also be rephrased as operating the protection device 300, turning off the protection device 300, opening the protection device 300, blocking a current with the protection device 300, or the like. The trip power supply 200 may trip the protection device 300 by causing a current to flow or may trip the protection device 300 by transmitting a trip instruction via a signal line.

The protection device 300 is, for example, an MCCB and is tripped when a current equal to or greater than a rated current flows for a predetermined time or more. The current equal to or greater than the rated current is a current with a current value equal to or greater than a current value of the rated current.

The load 600 is, for example, an ICT device of a server or the like, an electric vehicle (EV), or the like. In the example of FIG. 4, the load 600 is connected as a device at the end of the feeding system. However, instead of the load 600, a power generation unit (solar power generation unit or the like) may be connected. For example, power generated by the power generation unit is supplied to loads of other distributed units or is supplied to the outside (a distribution network).

(Configuration of Control Device 170 and Operation of Each Unit)

Next, a configuration of the control device 170 and an operation of each unit will be described. As illustrated in FIG. 4, the control device 170 includes a monitoring unit 120, a communication unit 130, a control unit 140, and a display unit 150. The "communication unit 130+control unit 140" may also be called a control unit.

The monitoring unit 120 determines whether a short circuit leading to an operation of the gate block unit 110 has occurred. When the monitoring unit 120 determines that the short circuit has occurred, the monitoring unit 120 notifies the control unit 140 that the short circuit has occurred.

For example, as illustrated in FIG. 1, when a short circuit has occurred near a load at the end of the feeding system, a current which is not as large as that with which the protection device 300 operates but is larger than that in a normal state flows in the feeding line.

Accordingly, for example, when the monitoring unit 120 detects that a current equal to or greater than a threshold TH1 and less than a threshold TH2 (>TH1) flows for a predetermined time or more, the monitoring unit 120 determines that the short circuit leading to an operation of the gate block unit 110 has occurred. The "predetermined time" can be set arbitrarily in accordance with a feeding system. The threshold TH1 is a value at which an erroneous operation or the like caused due to noise is prevented. A current equal to or greater than a certain threshold value is a current with a current value equal to or greater than the threshold value due to a rush current.

With a current less than the threshold TH2, it is assumed that the protection device 300 does not operate. If a current equal to or greater than the threshold TH2 flows, it is assumed that the protection device 300 operates. Therefore, the gate block unit 110 does not operate. However, this is exemplary. The threshold TH2 may not be set and the gate block unit 110 may operate when a current equal to or greater than the threshold TH1 flows.

As described above, when the short circuit has occurred near the load of the feeding system, a current which is not as large as that with which the protection device 300 operates but is larger than that in the normal state flows in the feeding line. Therefore, the power unit 160 operates so that a voltage is lowered.

Therefore, for example, the monitoring unit 120 monitors a voltage between the positive-side feeding line and the negative-side feeding lines (a feeding voltage). When the monitoring unit 120 detects that lowering of a voltage equal to or greater than a threshold TH3 and less than a threshold TH4 (>TH3) continues for a predetermined time or more ("(lowered voltage/rated voltage) %"), the monitoring unit 120 determines that a short circuit leading to opening (OFF) of the gate block unit 110 has occurred. A case in which the lowering of the voltage is monitored in this way is substantially equivalent to monitoring of a short-circuit current.

When the voltage is lowered to a voltage less than the threshold TH4, it is assumed that the protection device 300 does not operate. When it is detected that lowering of a voltage equal to or greater than the threshold TH4, it is assumed that the protection device 300 operates. Therefore, the gate block unit 110 does not operate. However, this is exemplary. The gate block unit 110 may be operated when the threshold TH4 is not provided and lowering of a voltage equal to or greater than the threshold TH3 is detected.

When the monitoring unit 120 notifies the control unit 140 that the short circuit has occurred, a display instruction is shown on the display unit 150 and the communication unit 130 is instructed to transmit a signal. The control unit 140 also has a function of performing an experiment.

The display unit 150 may be a display, a lamp, an LED, or the like. Based on the instruction from the control unit 140, the display unit 150 displays information (which may be referred to as a warning) indicating that the short circuit has occurred on a display or lights a lamp. The display unit 150 may not be equipped.

Based on the instruction from the control unit 140, the communication unit 130 transmits a signal for operating the gate block unit 110 to the gate block unit 110. The gate block unit 110 receiving the signal performs gate block. That is, the gate block unit 110 of the power unit 160 is opened (turned off) to stop the feeding of the power.

Based on the instruction from the control unit 140, the communication unit 130 transmits an instruction signal to the trip power supply 200 and causes the trip power supply 200 to operate the protection device 300.

Operation Example 1

Operation Example 1 related to the protection device 300 in a case in which a short circuit leading to an operation of the gate block unit 110 has occurred will be described.

For example, it is assumed that a short circuit has occurred in a feeding line close to the load 600-3 of the distributed unit 3. In this case, the monitoring unit 120 detects the short circuit leading to an operation of the gate block unit 110 and the gate block unit 110 performs the gate block based on a signal received from the communication unit 130.

The control unit 140 instructs the communication unit 130 to transmit a signal for operating the protection devices 300 of all the distributed units 1 to 4 and the communication unit 130 transmits the signal for operating the protection devices 300 of all the distributed units 1 to 4 to the trip power supply 200. The trip power supply 200 receiving this signal operates the protection devices 300 of all the distributed units 1 to 4.

Operation Example 2

Operation Example 2 related to the protection device 300 in a case in which a short circuit leading to an operation of the gate block unit 110 has occurred will be described.

For example, it is assumed that a short-circuit has occurred in a feeding line close to the load 600-3 of the distributed unit 3. In this case, the monitoring unit 120 detects the short circuit leading to an operation of the gate block unit 110 and the gate block unit 110 performs the gate block based on a signal received from the communication unit 130.

In Operation Example 2, after the gate block, the control unit 140 operates the protection devices 300-1 to 300-4 in order one by one from the protection device 300-1. The control unit 140 performs an experiment to inspect whether a current flows in the feeding line by adding a low voltage (for example, 1 V) from the monitoring unit 120 to the feeding line before one protection device is blocked. When there is a short-circuited portion, a current flows. Therefore, it can be understood that there is a short circuit has occurred in the distributed unit to which the protection device 300 operated immediately before non-flow of a current belongs. A more specific example is as follows.

After the gate block, the control unit 140 instructs the monitoring unit 120 to apply a low voltage, and then the monitoring unit 120 detects a current. Subsequently, the control unit 140 instructs the communication unit 130 to transmit a signal for operating the protection device 300-1, and then the communication unit 130 transmits the signal for operating the protection device 300-1 to the trip power supply 200. The trip power supply 200 receiving this signal operates the protection device 300-1.

In the same order, the protection device 300-2 is operated to detect a current in a subsequent low-voltage application experiment. Subsequently, in the same order, the protection device 300-3 is operated. Thus, since the short-circuited portion in the distributed unit 3 is blocked from the power device 100, a current is not detected in a subsequent low-voltage application experiment. The monitoring unit 120 notifies the control unit 140 that a current is not detected in the low-voltage application experiment. Then, the control unit 140 determines that there is the short-circuited portion in the distributed unit 3 and causes, for example, the display unit 150 to display the short-circuited portion (in this case, the distributed unit 3).

(Detecting Ground Fault)

In the above-described examples, a short circuit is targeted as an exemplary accident and the gate block unit 110 is operated when a short circuit is detected. However, the gate block unit 110 may be operated when a ground fault is detected.

For example, by providing the protection device 300 appropriate for detecting a ground fault (an earth leakage breaker or the like), it is possible to operate the protection device 300 in accordance with a ground fault current when a ground fault has occurred near the protection device 300 in the distributed unit. However, when a ground fault has occurred near the load 600, a ground fault current decreases due to large wiring resistance and the protection device 300 cannot be operated in accordance with the ground fault current, similarly to the case of the short circuit.

Accordingly, similarly to the case of the short circuit, when the monitoring unit 120 of the control device 170 detects a ground fault leading to an operation of the gate block unit 110, the communication unit 130 transmits a signal to the gate block unit 110 based on an instruction from the control unit 140 to operate the gate block unit 110.

After the gate block, each protection device 300 is operated. Operation Example 1 and Operation Example 2 in the case of the short circuit can be similarly applied to a case of a ground fault.

Figure 6:
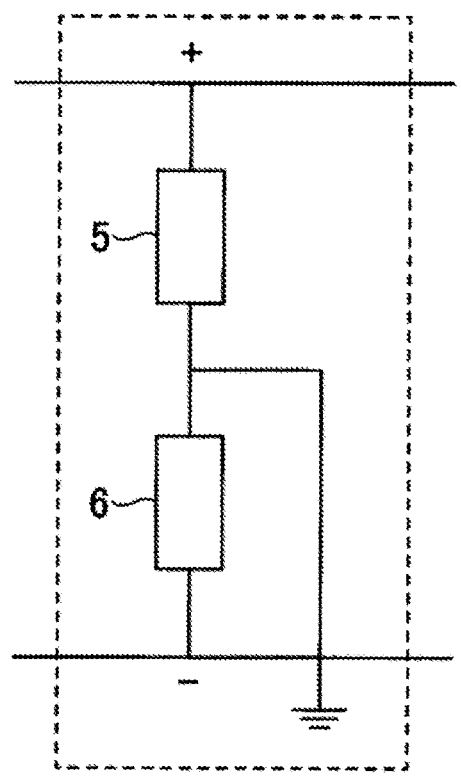
FIG. 6 is a diagram illustrating a ground fault overvoltage detection type of ground fault detector.

A method in which the monitoring unit 120 detects a ground fault is not limited to a specific method. For example, as illustrated in FIG. 6, a ground fault overvoltage detection type of ground fault detection scheme configured to earth a neutral point by providing resistances 5 and 6 (both of which have high resistances) between the ground, and a positive-side feeding line and a negative-side feeding line may be used.

In this case, for example, the monitoring unit 120 monitors a voltage between both ends of the resistance 5 and a voltage between both ends of the resistance 6. When the monitoring unit 120 detects that a change equal to or greater than a threshold TH5 and less than a threshold TH6 (>TH5) is continuously detected in a voltage at any resistance for a predetermined time or more, the monitoring unit 120 determines that a ground fault leading to an operation of the gate block unit 110 has occurred and outputs a signal indicating the detection of the ground fault. Here, this is exemplary. When the threshold TH6 is not provide and a change in a voltage equal to or greater than the threshold TH5 is detected, the gate block unit 110 may be operated. It may be monitored whether a ground fault leading to an operation of the gate block unit 110 has occurred by monitoring a current (a ground fault current), instead of monitoring the voltage.

(Example in which ZCT is Used)

Figure 7:
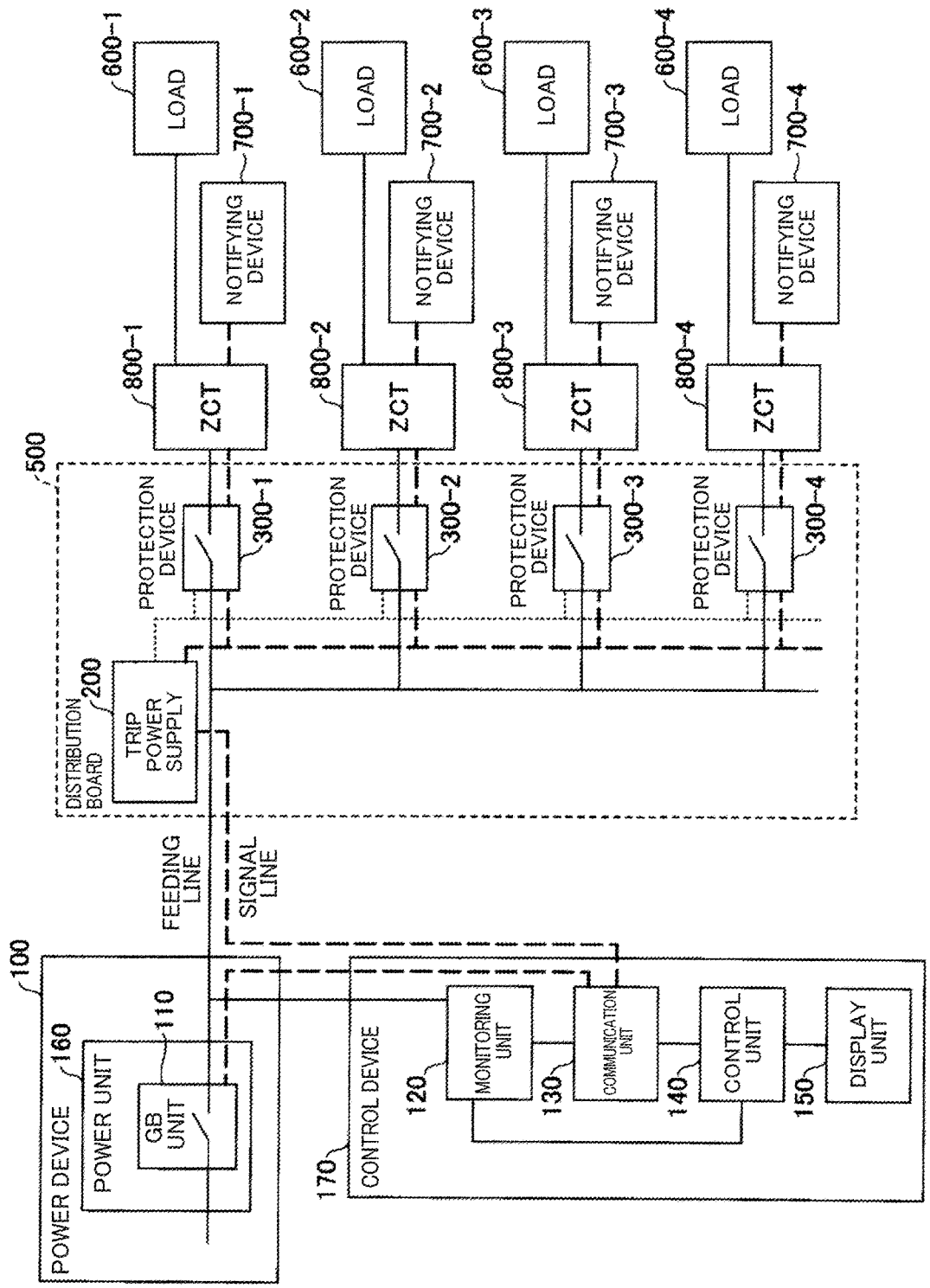
FIG. 7 is a diagram illustrating a configuration of a feeding system including ZCT.

When a ground fault is targeted, as illustrated in FIG. 7, an unbalanced current detection type of ground fault detector 800 may be equipped in each distributed unit. In FIG. 7, the unbalanced current detection type of ground fault detector 800 is written as a ZCT 800.

The unbalanced current detection type of ground fault detector 800 (hereinafter referred to as the ZCT 800) includes a zero-phase current transformer (ZCT) and outputs a current (or voltage) generated due to unbalance when there is the unbalance in a reciprocating current between a positive-side feeding line and a negative-side feeding line. Alternatively, when it is detected that a value of the current (or voltage) generated due to the unbalance is equal to or greater than a threshold, a signal indicating that a ground fault is detected may be output. The ZCT 800 is connected to a notifying device 700. The notifying device 700 can transmit and receive signals to and from the control device 170 via a signal line.

Figure 8:
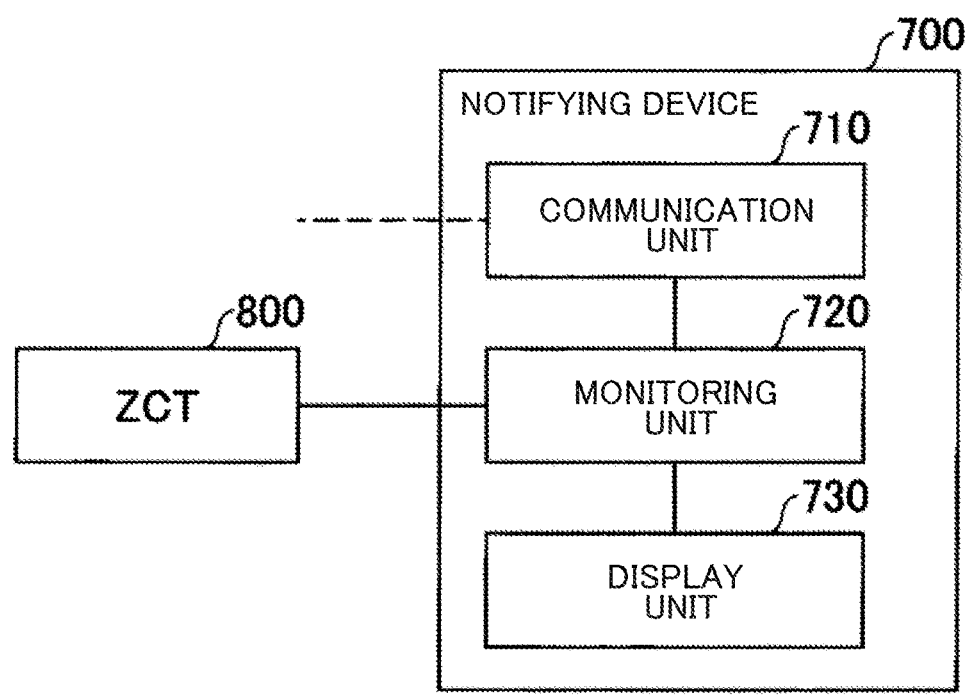
FIG. 8 is a diagram illustrating a configuration of a notifying device.

FIG. 8 illustrates an exemplary configuration of the notifying device 700. As illustrated in FIG. 8, the notifying device 700 includes a communication unit 710, a monitoring unit 720, and a display unit 730. When the monitoring unit 720 detects a ground fault, the communication unit 710 transmits a signal indicating that the ground fault is detected to the control device 170.

The monitoring unit 720 monitors whether a signal indicating that the ground fault is detected is received from, for example, the ZCT 800. When the signal is received, the monitoring unit 720 determines that the ground fault has occurred and outputs a signal indicating that the ground fault has occurred. The monitoring unit 720 and the ZCT 800 may be connected by a signal line or may be connected by an individual line.

Alternatively, the monitoring unit 720 measures a generated unbalanced current (or voltage) of the reciprocating current in the ZCT 800. When the monitoring unit 720 detects that the value of the current is equal to or greater than a threshold, the monitoring unit 720 may determine that the ground fault has occurred and may output a signal indicating that the ground fault has occurred.

The display unit 730 may be a display, a lamp, an LED, or the like. When the monitoring unit 720 detects that the ground fault, the display unit 730 displays information indicating that the ground fault has occurred on the display or lights a lamp. The display unit 730 may not be equipped.

Based on a ground fault detection result in the monitoring unit 120 and a signal (a ground fault detection result)

received from the notifying device 700 via the communication unit 130, the control unit 140 of the control device 170 determines whether the gate block unit 110 is operated. The distributed unit in which the ground fault has occurred can also be determined.

When the ZCT 800 is used, it is assumed that a ground fault is detected by the ZCT 800 and the ground fault is detected by the monitoring unit 120 (through the monitoring of the ground fault overvoltage detection type of ground fault detector) in a case in which the ground fault actually occurs between the ZCT 800 and the load 600. It is also assumed that the ZCT 800 detects (erroneously detects) unbalance (noise) of a minute reciprocating current as a ground fault although the ground fault has not actually occurred.

Based on the foregoing assumption, the control unit 140 of the control device 170 performs any of the following determinations (1) to (3).

Determination (1): the control unit 140 of the control device 170 determines that the ground fault has occurred between the ZCT 800 of any distributed unit (here, a distributed unit A is used as an example) and the load 600 of the distributed unit A when the ground fault is detected by the ZCT 800 and the ground fault is detected by the monitoring unit 120 (through the monitoring of the ground fault overvoltage detection type of ground fault detector). In this case, the gate block unit 110 is operated and the protection devices 300 of all the distributed units are operated. Only the protection device 300 of the distributed unit A may be operated without operating the gate block unit 110.

The gate block unit 110 may be operated and only the protection device 300 of the distributed unit A closest to an accident point may be operated. To operate the protection device 300, the control unit 140 may transmits a signal to the trip power supply 200 via the communication unit 130 and the protection device 300 may be operated with the trip power supply 200. The control unit 140 may transmit a signal to a terminal or the like of an operator via the communication unit 130 and the operator may operate the protection device 300.

Determination (2): when the ground fault is not detected by the ZCT 800 of any distributed unit and the ground fault is detected by the monitoring unit 120 (through the monitoring of the ground fault overvoltage detection type of ground fault detector), the control unit 140 of the control device 170 determines that the detection of the ground fault by the ZCT 800 is erroneous detection (noise) or an erroneous operation and determines that all of the protection device 300 and the gate block unit 110 are not operated.

Determination (3): when the ground fault is not detected in the ZCT 800 of any distributed unit and the ground fault is detected by the monitoring unit 120 (through the monitoring of the ground fault overvoltage detection type of ground fault detector), the control unit 140 of the control device 170 determines that the ground fault is detected between the power device 100 and the ZCT 800. In this case, the gate block unit 110 is operated and the protection devices 300 of all the distributed units are operated.

The feeding system according to the embodiment may have both the function of detecting a ground fault and operating the gate block unit 110 or the protection device 300, as described above, and the function of detecting a short circuit and operating the gate block unit 110 or the protection device 300, as described above, or may have only one of the functions.

(Exemplary Hardware Configuration)

Each of the control device 170 and the notifying device 700 may be implemented, for example, by causing a computer to execute a program describing the processing content described in the embodiment. It is not necessary for one computer to include each unit included in the control device 170. For example, the communication unit 130 and the control unit 140 may be implemented, for example, by causing one computer to execute a program describing the processing content described in the embodiment.

The program can be recorded on a computer-readable recording medium (a portable memory or the like) to store or distribute the program. The program can also be provided via a network such as the Internet or an electronic mail.

Figure 9:
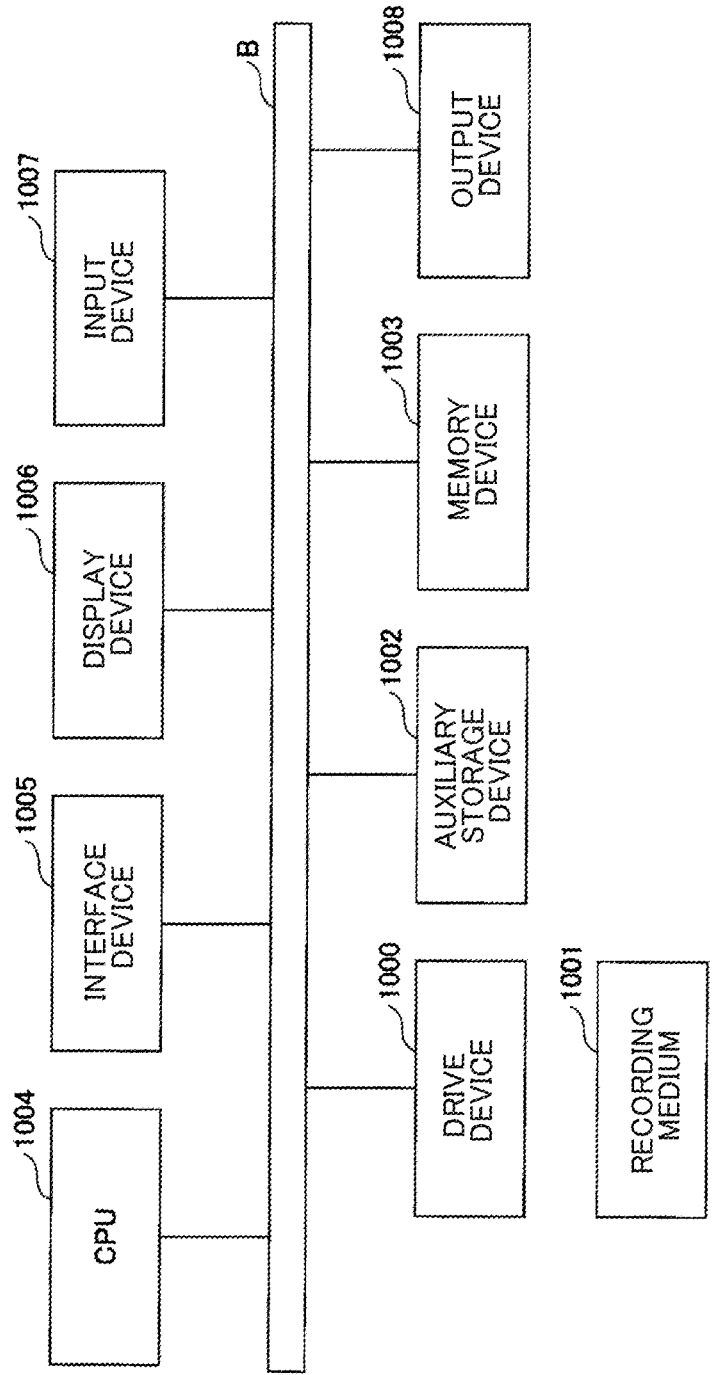
FIG. 9 is a diagram illustrating a hardware configuration of a device.

FIG. 9 is a diagram illustrating an exemplary hardware configuration of the computer. The computer of FIG. 9 includes a drive device 1000, an auxiliary storage device 1002, a memory device 1003, a CPU 1004, an interface device 1005, a display device 1006, an input device 1007, and an output device 1008 connected to each other via a bus BS.

The program implementing a process in the computer is provided by, for example, a recording medium 1001 such as a CD-ROM or a memory card. When the recording medium 1001 storing the program is set in the drive device 1000, the program is installed from the recording medium 1001 to the auxiliary storage device 1002 via the drive device 1000. Here, it is not necessary to install the program from the recording medium 1001, but the program may be downloaded from another computer via a network. The auxiliary storage device 1002 stores the installed program and necessary files, data, and the like.

The memory device 1003 reads the program from the auxiliary storage device 1002 and stores the program when there is an instruction to activate the program. The CPU 1004 implements the function related to the device (or the control unit or the like) in accordance with the program stored in the memory device 1003. The interface device 1005 is used as an interface for connecting a network (a signal line). The display device 1006 displays a graphical user interface (GUI) in accordance with the program. The input device 1007 is configured by a keyboard and a mouse, a button, a touch panel, or the like and is used to input various operational instructions. The output device 1008 outputs a calculation result. The display device 1006 may be the display unit 150 or 730.

Advantage of Embodiment

According to the technology described in the embodiment, it is possible to cut off an accident portion from a power supply or stop the power supply even when an accident causing a protection device not to operate has occurred, and thus protect a sound circuit.

Summary of Embodiment

In the present specification, a feeding system, a protection coordination method, and a program at least described in each of the following clauses are described.

(Clause 1)

A feeding system that feeds power from a power unit to a load via a feeding line, the feeding system including:

a protection device configured to operate by a current equal to or greater than a predetermined current;

a monitoring unit configured to monitor whether an accident occurs in the feeding line; and a gate block unit configured to stop the feeding of the power of the power unit when the monitoring unit detects that an accident causing the protection device not to operate has occurred.

(Clause 2)

The feeding system according to clause 1, wherein, when the monitoring unit detects that a current less than the predetermined current flows in the feeding line for a predetermined time or more or detects that a feeding voltage decreases for a predetermined time or more, the monitoring unit determines that a short circuit or a ground fault has occurred as the accident in the feeding line.

(Clause 3)

The feeding system according to clause 1 or 2, further including:
a control unit configured to operate the protection device after the gate block unit operates.

(Clause 4)

The feeding system according to clause 3, further including: a plurality of distributed units distributed from a distribution board connected to the power unit,
wherein each distributed unit includes a protection device, and
wherein, after the gate block unit operates, the control unit operates the protection device of the distributed unit closest to an accident point or transmits a signal, or operates the protection device and transmits the signal.

(Clause 5)

The feeding system according to clause 3, further including: a plurality of distributed units distributed from a distribution board connected to the power unit,
wherein each distributed unit includes a protection device, and
wherein, after the gate block unit operates, the control unit operates the protection devices of the distributed units in order one by one and determines that the accident has occurred in the distributed unit immediately previously operating protection device when it is detected that a current does not flow before operating of one protection device by adding a voltage to the feeding line.

(Clause 6)

The feeding system according to any one of clauses 3 to 5, further including:
a plurality of distributed units distributed from a distribution board connected to the power unit,
wherein each distributed unit includes an unbalanced current detection type of ground fault detector, and
wherein the control unit determines whether a ground fault has occurred in a specific distributed unit based on a ground fault detection result obtained through ground fault overvoltage detection in the monitoring unit and a ground fault detection result obtained in each distributed unit by the unbalanced current detection type of ground fault detector.

(Clause 7)

A protection coordination method performed by a feeding system that feeds power from a power unit to a load via a feeding line,
wherein the feeding system includes a protection device that operates by a current equal to or greater than a predetermined current and a monitoring unit that monitors whether an accident occurs in the feeding line,
wherein the method comprises gate block performed to stop the feeding of the power of the power unit when the monitoring unit detects that an accident causing the protection device not to operate has occurred.

(Clause 8)

A program causing a computer to function as the control unit in the feeding system according to any one of clauses 3 to 6.

The embodiment has been described above, but the present invention is not limited to the specific embodiment. Various modifications and changes can be made within the scope of the gist of the present invention described in the claims.

REFERENCE SIGNS LIST 1 to 3, 5, 6 Resistance
4, 600 Load
100 Power device
110 Gate block unit
120, 720 Monitoring unit
130, 710 Communication unit
140 Control unit
150, 730 Display unit
160 Power unit
170 Control device
200 Trip power supply
300 Protection device
500 Distribution board
700 Notifying device
800 ZCT
1000 Drive device
1001 Recording medium
1002 Auxiliary storage device
1003 Memory device
1004 CPU
1005 Interface device
1006 Display device
1007 Input device
1008 Output device

The invention claimed is:

1. A feeding system configured to feed power from a power unit to a load via a feeding line, the feeding system comprising:
a protection device configured to operate with a current equal to or greater than a predetermined current;
a monitoring unit configured to monitor whether an accident occurs in the feeding line;
a gate block unit configured to stop feeding of the power of the power unit when the monitoring unit detects that an accident causing the protection device not to operate has occurred; and
a control unit configured to operate the protection device after the gate block unit operates.

2. The feeding system according to claim 1, wherein, when the monitoring unit detects that a current less than the predetermined current flows in the feeding line for a predetermined time or more or detects that a feeding voltage decreases for a predetermined time or more, the monitoring unit is configured to determine that a short circuit or a ground fault has occurred as the accident in the feeding line.

3. The feeding system according to claim 1, further comprising:
a plurality of distributed units distributed from a distribution board connected to the power unit,
wherein each distributed unit includes a protection device, and
wherein, after the gate block unit operates, the control unit is configured to operate the protection device of the distributed unit closest to an accident point or transmits a signal, or operates the protection device and transmits the signal.

4. The feeding system according to claim 3,
wherein each distributed unit includes an unbalanced current detection type of ground fault detector, and
wherein the control unit determines whether a ground fault has occurred in a specific distributed unit based on a ground fault detection result obtained through ground fault overvoltage detection in the monitoring unit and a ground fault detection result obtained in each distributed unit by the unbalanced current detection type of ground fault detector.

5. A non-transitory computer readable medium storing a program, wherein executing of the program causes a computer to operate as the control unit in the feeding system according to claim 3.

6. The feeding system according to claim 1, further comprising:
a plurality of distributed units distributed from a distribution board connected to the power unit,
wherein each distributed unit includes a protection device, and
wherein, after the gate block unit operates, the control unit is configured to add a voltage to the feeding line, operate the protection devices of the distributed units in order one by one, and determine that the accident has occurred in the distributed unit that immediately previously operated one of the protection devices when detecting that a current no longer flows before operating the one of the protection devices.

7. The feeding system according to claim 6,
wherein each distributed unit includes an unbalanced current detection type of ground fault detector, and
wherein the control unit determines whether a ground fault has occurred in a specific distributed unit based on a ground fault detection result obtained through ground fault overvoltage detection in the monitoring unit and a ground fault detection result obtained in each distributed unit by the unbalanced current detection type of ground fault detector.

8. A non-transitory computer readable medium storing a program, wherein executing of the program causes a computer to operate as the control unit in the feeding system according to claim 6.

9. The feeding system according to claim 1, further comprising:
a plurality of distributed units distributed from a distribution board connected to the power unit,
wherein each distributed unit includes an unbalanced current detection type of ground fault detector, and
wherein the control unit is configured to determine whether a ground fault has occurred in a specific distributed unit based on a ground fault detection result obtained through ground fault overvoltage detection in the monitoring unit and a ground fault detection result obtained in each distributed unit by the unbalanced current detection type of ground fault detector.

10. A non-transitory computer readable medium storing a program, wherein executing of the program causes a computer to operate as the control unit in the feeding system according to claim 9.

11. A non-transitory computer readable medium storing a program wherein executing of the program causes a computer to operate as the control unit in the feeding system according to claim 1.

12. A protection coordination method performed by a feeding system configured to feed power from a power unit to a load via a feeding line, comprising:
operating, by a protection device, with a current equal to or greater than a predetermined current;
monitoring, by a monitoring unit, whether an accident occurs in the feeding line;
performing gate block to stop feeding power of the power unit when detecting that the accident causing the protection device not to operate has occurred; and
operating the protection device after performing the gate block.

* * * * *